United States Patent
Marcerou et al.

(10) Patent No.: US 6,681,066 B2
(45) Date of Patent: Jan. 20, 2004

(54) SOLITON PULSE TRANSMISSION OVER WAVEGUIDE FIBER LENGTHS

(75) Inventors: Jean-François Marcerou, Corbeil-Essonnes (FR); Mireille Marcerou, Corbeil Essonnes (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/913,500

(22) PCT Filed: Dec. 18, 2000

(86) PCT No.: PCT/FR00/03575

§ 371 (c)(1),
(2), (4) Date: Aug. 16, 2001

(87) PCT Pub. No.: WO01/47153

PCT Pub. Date: Jun. 28, 2001

(65) Prior Publication Data

US 2002/0159687 A1 Oct. 31, 2002

(30) Foreign Application Priority Data

Dec. 20, 1999 (FR) .............................................. 99 16045

(51) Int. Cl.⁷ ................................................. G02B 6/26
(52) U.S. Cl. ............................... 385/27; 385/10; 385/2; 385/3; 385/37; 398/192
(58) Field of Search ............................ 385/1–3, 27, 24, 385/30, 10, 37; 359/161

(56) References Cited

U.S. PATENT DOCUMENTS 5,828,478 A * 10/1998 Thomine et al. ............ 359/181

FOREIGN PATENT DOCUMENTS

WO    WO 99/59025    11/1999

OTHER PUBLICATIONS

B. Mikkelsen et al, "All Optical Reduction Capability of Interferometric Wavelength Converters" Electronics Letters, Great Britian, vol. 32, No. 6, Mar. 14, 1996 pp. 566–567, XP000593639.

M. E. Bray et al, "Cascading Gain–Saturation Semiconductor Laser–Amplifier Wavelength Translators", IEE Proceedings, Optoelectronics, vol. 143, No. 1 dated Feb. 1, 1996.

Shigeki Watanabe et al, "Generation of Optical Phase–Conjugate waves and Compensation for Pulse Shape Distortion in a Single–Mode Fiber", Journal of Lightwave Technology, US, IEEE, New York, vol. 12, No. 12, Dec. 1, 1994.

* cited by examiner

Primary Examiner—Drew Dunn
Assistant Examiner—Fayez Assaf
(74) Attorney, Agent, or Firm—Sughrue Mion, PLLC

(57) ABSTRACT

The invention proposes to increase the signal/noise ratio in a long-haul transmission system by:

filtering noise (1) outside the range of wavelength of the signals transmitted, shifting (2) the wavelength of the signals transmitted, and filtering the signals transmitted (5) that have undergone wavelength shifting.

The wavelength of the signals can be shifted by widening the spectrum of the signals or by optical phase conjugation.

15 Claims, 2 Drawing Sheets

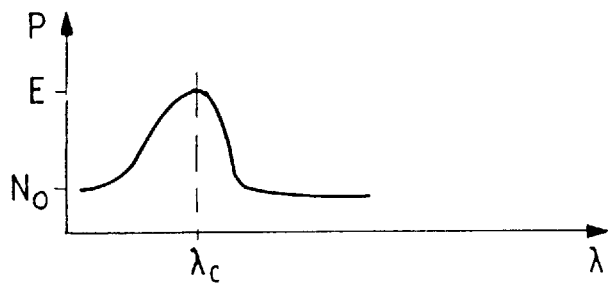
FIG_1
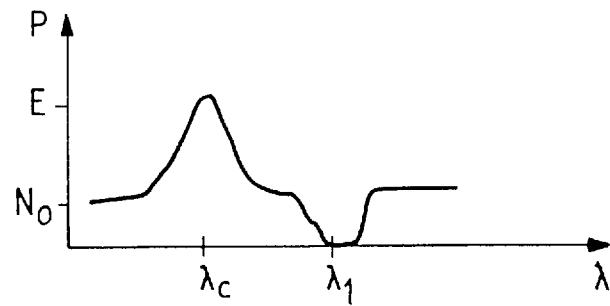
FIG_2
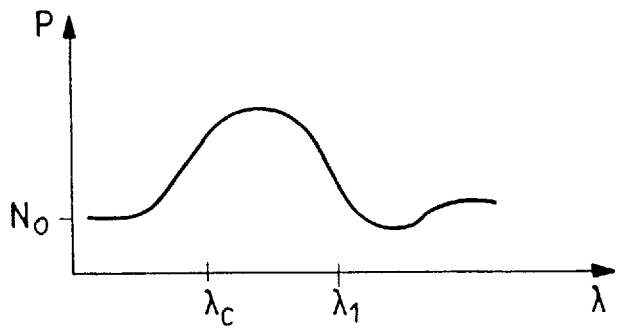
FIG_3
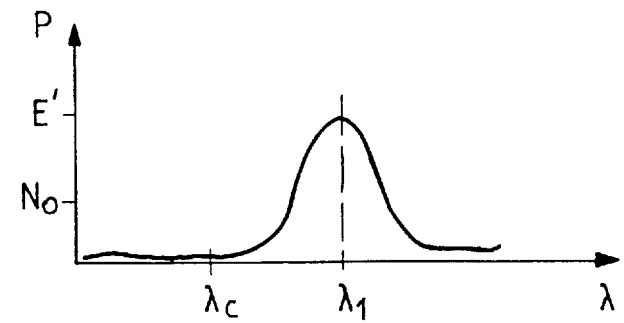
FIG_4
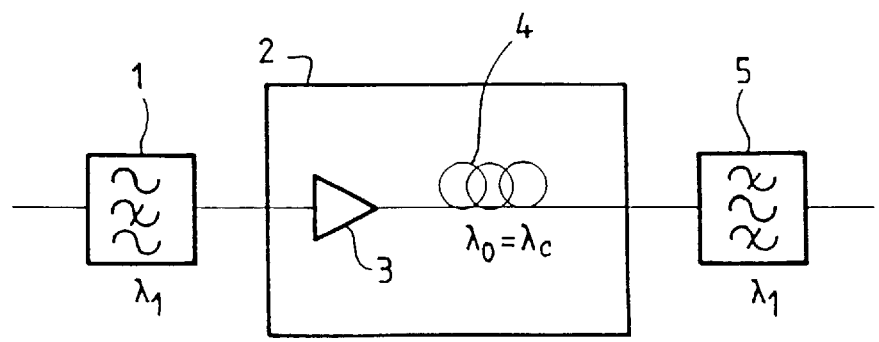
FIG_5

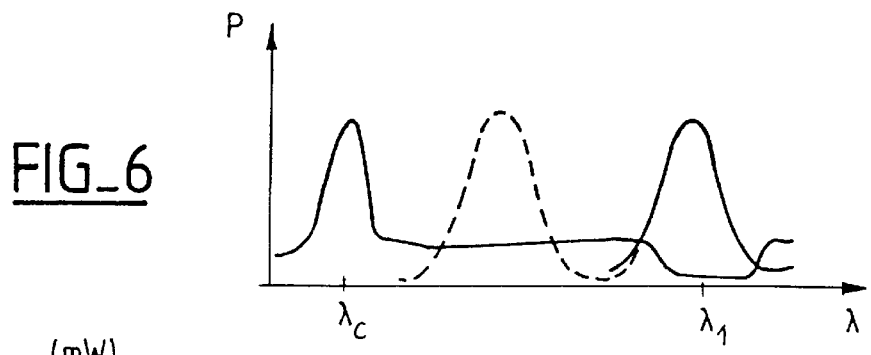
FIG_6
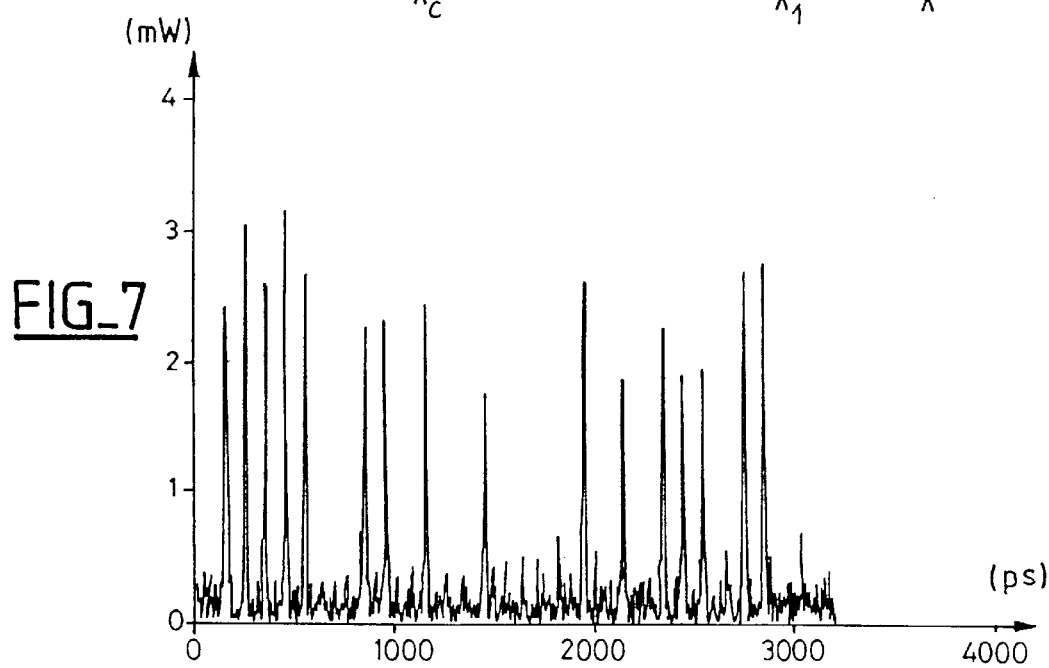
FIG_7
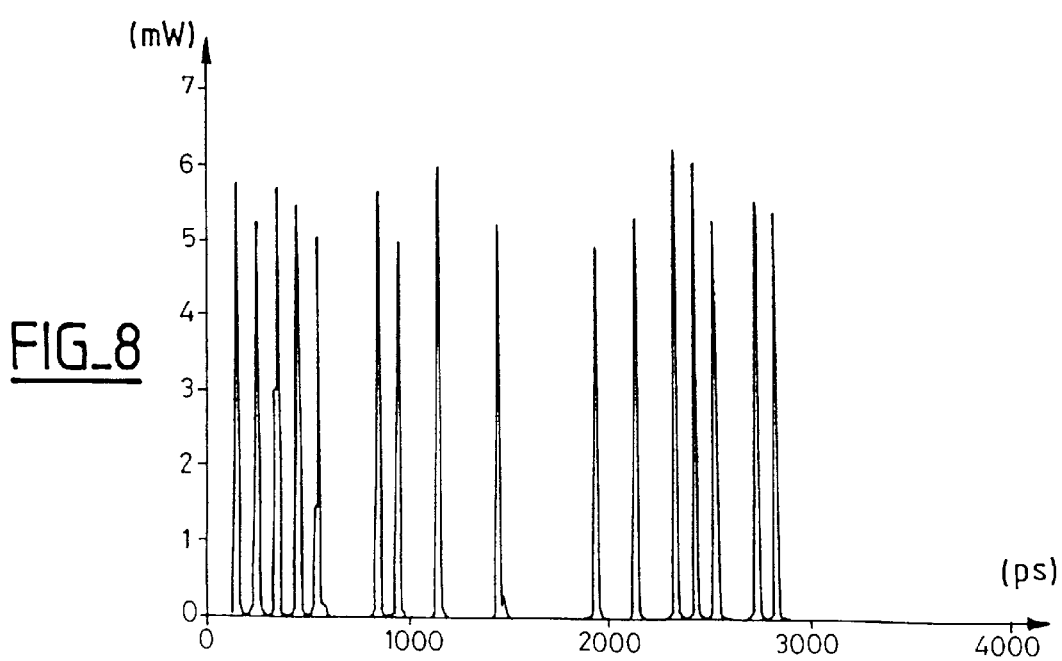
FIG_8

SOLITON PULSE TRANSMISSION OVER WAVEGUIDE FIBER LENGTHS

BACKGROUND OF THE INVENTION

The present invention relates to fiber optic transmission systems and more particularly to optical links and networks having a very high capacity and covering very long distances. By optical links with a very high capacity is meant transmission systems providing a bit rate greater than 10 Gbit/s. By transmission systems covering very long distances is meant systems covering propagation distances of the order of 5000 km or more.

At present obtaining very high capacities on long systems is not possible, apart from N*2.5 Gbit/s wavelength division multiplex systems, even though papers have been published reporting laboratory results that are as yet incompatible with the requirements of real systems.

At present, RZ (return to zero) pulse transmission and NRZ (no return to zero) pulse transmission are widely used in long-haul fiber optic transmission systems. One problem for this type of system is that the signal/noise ratio increases as the number of repeaters in the system increases, due in particular to amplified spontaneous emission (ASE) noise.

In the case of soliton signal transmission systems, to reduce the amplified spontaneous emission noise, and thereby to increase the signal/noise ratio, it has been proposed, for example in EP-A-0 576 208, to use sliding guiding filter systems. This solution is based on the particular nature of solitons and their capacity for selfregeneration. In other words, soliton signals track the sliding of the filters, whereas the amplified spontaneous emission noise is filtered out.

This solution also applies to types of signals other than soliton signals. However, because it relies on self-phase-modulation of the signals, it is difficult to implement for wavelength division multiplex transmission systems, because of crossed phase modulation between channels. The passage of the signals through the sliding filters implies a high level of self-phase-modulation, which goes hand in hand with a high level of crossed phase modulation. To obtain results with this type of solution in a wavelength division multiplex transmission system it would be necessary to separate the various channels well beyond the band of a few nanometers available for the signals.

The transmission of signals in optical systems is also limited by non-linear effects, such as the Kerr effect, the Brillouin effect, the Raman effect and four-wave mixing. G. P. Agrawal, "Nonlinear Fiber Optics", Academic Press, 1980 describes these non-linear effects. They depend on the level of noise in the optical fibers of the transmission system.

SUMMARY OF THE INVENTION

The invention proposes a solution to the problem of increasing noise, and in particular of amplified spontaneous emission noise in a fiber optic transmission system. It significantly improves the quality factor of transmission systems, especially systems of very high capacity and covering long distances. The invention eliminates most of the noise at the wavelengths of the signals transmitted and makes possible "linear" transmission that is not limited by the noise level; it also makes possible nonlinear transmission limited by the effects of the noise. Some embodiments of the invention reduce the timing jitter of the signals.

To be more precise, the invention proposes a noise-reducing device for a fiber optic transmission system, said device including first means for filtering noise outside the range of wavelengths of the signals transmitted, means for shifting the wavelength of the signals transmitted, and second means for filtering the transmitted signals that have undergone wavelength shifting.

The device advantageously includes second wavelength shifting means for returning the signals that have undergone the second filtration to their initial wavelength.

In one embodiment the wavelength shifting means include means for widening the spectrum of the signals.

The wavelength shifting means preferably include optical phase conjugation means.

In one embodiment the filtration means include a Bragg filter.

The invention also provides a fiber optic transmission system including at least one such device.

The invention further provides a method of reducing noise in a fiber optic transmission system, said method comprising the steps of filtering noise outside the range of wavelength of the signals transmitted, shifting the wavelength of the signals transmitted, and filtering the signals transmitted that have undergone wavelength shifting.

In one embodiment the method further includes a second wavelength shifting step for returning the signals that have undergone the second filtration step to their initial wavelength.

The wavelength shifting step advantageously includes widening the spectrum of the signal.

The wavelength shifting step can also include conjugation of the phase of the signal.

BRIEF DESCRIPTION OF THE DRAWINGS

Other features and advantages of the invention will become apparent on reading the following description of embodiments of the invention, given by way of example and with reference to the accompanying drawings, in which:

FIG. 1 shows the spectrum of signals in a transmission system;

FIG. 2 shows the spectrum of the signals after a first step of filtration in accordance with the invention;

FIG. 3 shows the spectrum of the signals after a step of wavelength shifting in accordance with the invention;

FIG. 4 shows the spectrum of the signals after a second step of filtration in accordance with the invention;

FIG. 5 is a diagram of a noise-reducing device in accordance with the invention;

FIG. 6 shows the spectra of the signals for wavelength shifting by optical phase conjugation;

FIG. 7 is a graph of the power of signals received in a conventional transmission system; and FIG. 8 is a graph of the power of signals received in a transmission system using the invention.

DETAILED DESCRIPTION OF THE INVENTION

The invention proposes to filter the signals transmitted and then to subject them to "non-linear hopping" so as to recover them in the range of wavelengths previously filtered, in which the noise has been reduced. It proposes various ways to effect the non-linear hopping, in other words to obtain a wavelength shift for the signals transmitted.

FIGS. 1 to 4 show the spectra of the signals in a first embodiment of the invention. In this embodiment, simple widening of the signals transmitted is used to subject the signals to non-linear hopping. FIG. 1 shows the spectrum of the signals. The noise level is of the order of $N_0$ and the signal level is of the order of E. The signals have wavelengths around $\lambda_c$, which is typically 1550 nm, the range of wavelengths in the transmission system extending from 1530 to 1580 nm.

The invention proposes firstly to filter noise outside the range of wavelengths of the signals. In the FIG. 2 example, the noise is filtered around the wavelength $\lambda_1$, which is higher than the wavelength $\lambda_c$. A band-pass filter or a high-pass filter can be used to filter the noise, for example. For RZ pulses centered at 1550 nm, which typically have a spectral width of 0.2 nm, the noise can be filtered around a wavelength $\lambda_1$ that is about 1 nm above the center wavelength of the pulses. The width of the filter can be of the order of 0.3 nm; it is advantageously chosen so that it does not reduce the power of the signals transmitted by more than 0.5 dB.

The invention then proposes to subject the signals transmitted to non-linear hopping, in other words to subject them to a wavelength shift, which does not apply much or at all to the noise. In the FIG. 3 example, simple widening of the signal is used to subject the signals to non-linear hopping. It can be obtained by disposing at the output of the amplifier a section of fiber having zero chromatic dispersion for a wavelength close to that of the signals transmitted, for example. The effect of such a fiber section is to explode the spectrum into sub-components, as a function of the power and the wavelength. The choice of the amplification gain can be optimized to encourage the widening of the signals transmitted at $\lambda_c$ to maximize the proportion of the signals transmitted around the wavelength $\lambda_1$.

FIG. 3 shows the shape of the widened signal. Note that this solution is preferably applied to RZ pulses. It has the advantage that it also peak limits the pulses, in other words reduces the excess power of the pulses.

The invention then proposes to filter the signals and the noise outside the range of wavelengths centered on $\lambda_1$. Such filtering recovers the original part of the signals transmitted whilst eliminating noise at the output. In fact, in the first filtration step of FIG. 2, the noise is eliminated around $\lambda_1$. In the second filtration step, only signals around $\lambda_1$ are recovered, i.e. signals in a range of wavelengths in which the noise is low. In fact, the non-linear character of the widening ensures that the noise does not pass much or at all into the range around the wavelength $\lambda_1$. FIG. 4 shows the shape of the signals obtained after filtration around $\lambda_1$. The level of the signals around $\lambda_1$ is denoted E' in the figure. The value of E' is of the same order as the value E of the power of the signal; the loss by shifting and filtering the signals is compensated in this embodiment by amplifying the signals used for widening the signals.

In this embodiment, with values of the order of 1 nm for the difference between the wavelengths $\lambda_1$ and $\lambda_c$, Bragg filters operating in reflection can be used to filter the signals, or filters known in the art having analogous performance.

FIG. 5 is a diagrammatic representation of a noise-reducing device in accordance with the invention. The device has first filter means 1 that filter noise around the wavelength $\lambda_1$ with no or little power reduction in the range of wavelengths of the signals transmitted. The device then has wavelength shifting means 2; in the embodiment shown in the figure, the wavelength shifting means include an amplifier 3 followed by a loop of fiber having zero chromatic dispersion at the wavelength $\lambda_c$ of the signals transmitted. As explained above, the shifting means widen the spectrum of the signals transmitted so that the signals extend into the range of wavelengths in which noise has previously been filtered. After these shifting means the device includes second filter means 5 that filter signals outside the range of wavelengths around $\lambda_1$. Signals with a slightly different wavelength (a higher wavelength in the example) are recovered at the output of the device, with a higher signal/noise ratio.

To achieve greater shifts, up to a few nanometers, other signal widening means can be used. In the second embodiment of the invention, described next, optical phase conjugation is used to shift the signals transmitted. FIG. 6 shows the shape of the signals. It shows in full line the spectrum of the signal after filtering noise around the wavelength $\lambda_1$. The spectrum of a pump is shown in dashed line. The thick line shows the spectrum of the signal obtained around the wavelength $\lambda_1$ by four-wave mixing of the transmitted signals and the injected pump.

The second embodiment has the advantage of achieving greater differences between the wavelength $\lambda_c$ and $\lambda_1$, in other words a greater wavelength shift. This guarantees that the system has greater acceptance, in particular in the face of variations in the wavelength of the source sending the signal. Also, in the case of wavelength division multiplex transmission, the solution of the second embodiment shifts all the channels as a block, for example by means of a pump with a wavelength greater than the greatest wavelength of the channels of the multiplex. The second embodiment applies not only to RZ pulses but also to NRZ pulses. Finally, compared to the first embodiment, the second embodiment does not induce any frequency conversion of the signal, whose spectrum is modified less; this facilitates repetition of filtering and wavelength shifting.

A third embodiment of the invention proposes to use wavelength converters to apply the wavelength shift to the transmitted signals. In accordance with the invention, any wavelength converter device known in the art can be used, not only a converter based on optical conjugation of the signals in four-wave mixing, as in the second embodiment.

The three embodiments of the invention produce transmitted signals with a lower noise level around a wavelength shifted relative to the initial wavelength of the signals. The improvement in the signal/noise ratio con be of the order of 10 dB.

FIG. 7 shows the shape of the signals received at the receiver of a conventional fiber optic transmission system. Time in picoseconds is plotted on the abscissa axis and power in milliwatts is plotted on the ordinate axis. The signals are RZ pulses at a bit rate of 10 Gbit/s, and propagate in 5000 km of optical fiber with an injected power of −4 dBm. The figure shows a high noise level; the figure of merit of the link, measured in a manner known in the art, is of the order of 5.8.

FIG. 8 shows a similar graph for a link in accordance with the invention in which noise-reducing means of the type described above are provided in the receiver. As shown in the figure, the noise level is clearly lower, and the figure of merit is of the order of 18.4.

In accordance with the invention, a higher power can be injected into the link than is possible in the prior art.

The invention has been described with reference to FIGS. 1 to 8 in its simplest application. It is possible to perform transformations of the type described with reference to FIGS. 1 to 4 several times on a link. Thus, after recovering the signal around the wavelength $\lambda_1$ at the output of FIG. 4, it can be returned to the wavelength $\lambda_c$. For this, the process is the exact reverse of that described with reference to FIGS. 1 to 4: the first step is to filter noise around the wavelength $\lambda_c$, if this has not been done during the second filtration step of FIG. 4; the wavelength of the signals is then shifted from $\lambda_1$ to $\lambda_c$ by a process that is the reverse of that of FIG. 3. The signals around the wavelength k are then filtered. This "reversal", in terms of wavelength, further reduces the noise level; it has the advantage of returning the signals to the initial range of wavelengths.

The steps described above can also be repeated several times on the link, increasing or decreasing the wavelength. The number of repetitions without changing the direction of variation of the wavelength depends only on the transmission range of the fibers, amplifiers and other components of the transmission system.

The position of the noise-reducing device or devices in accordance with the invention depends on the required effects and the embodiment used. Noise can be produced in accordance with the invention anywhere along the transmission system. The noise is preferably reduced sufficiently early on for the pulses to have a much higher level than the noise. A signal/noise ratio of the order of 5 dB/nm or more is suitable.

In FIGS. 7 and 8, the noise is reduced in accordance with the invention in the receiver. It could have been reduced sooner; however, this embodiment is particularly advantageous for repeaterless systems. For systems using repeaters a noise-reducing device in accordance with the invention can be inserted after or before a repeater.

In the case of a wavelength division multiplex transmission system, noise can be reduced in all the channels of the multiplex at the same time, as in the second embodiment. If is also possible to operate channel by channel, after demultiplexing the signal, and then to remultiplex the signal afterwards. This solution has the advantage that the respective positions of two channels can be interchanged to preserve the spectral shape of the channels of the multiplex.

A noise-reducing device in accordance with the invention is advantageously associated with active devices such as phase or amplitude modulators for reducing timing jitter. In this way not only the noise but also the timing jitter of the signal are reduced.

Of course, the present invention is not limited to the examples and embodiments described and shown, and lends itself to many variants that will be evident to the skilled person. It applies in particular to all fiber optic transmission systems, regardless of the signals transmitted (RZ or NRZ pulses, solitons or other signals), on a single channel or with wavelength division multiplexing. It applies equally well to repeaterless transmission systems (with no electrically active elements in the link) and transmission systems using repeaters.

What is claimed is:

1. A noise-reducing device for a fiber optic transmission system, said device including:

first means for filtering noise outside the range of the signals transmitted, means for shifting the wavelength of the signals transmitted, and second means for filtering the transmitted signals that have undergone wavelength shifting.

2. The device according to claim 1, further including a second wavelength shifting means for returning the signals that have undergone second filtration to their initial wavelength.

3. The device according to claim 1, wherein the wavelength shifting means include means for widening the spectrum of the signals.

4. The device according to claim 1, wherein the wavelength shifting means include optical phase conjugation means.

5. The device according to claim 1, wherein the filtration means include a Bragg filter.

6. A fiber optic transmission system including a noise reducing device, said noise reducing device comprising:

a first mechanism configured to filter noise outside the range of the signals transmitted, a shifting mechanism configured to shift the wavelength of the signals transmitted, and a second mechanism configured to filter the transmitted signals that have undergone wavelength shifting.

7. A method of reducing noise in a fiber optic transmission system, said method comprising:

filtering noise outside the range of wavelength of the signals transmitted, shifting the wavelength of the signal transmitted, and filtering the signals transmitted that have undergone wavelength shifting.

8. The method according to claim 7, said method further including a second wavelength shifting step for returning the signals that have undergone the second filtration step to their initial wavelength.

9. The method according to claim 7, wherein the wavelength shifting step includes widening the spectrum of the signal.

10. The method according to claim 7, wherein the wavelength shifting step includes conjugation of the phase of the signal.

11. A noise-reducing device for a fiber optic transmission system, said device including:

a first mechanism configured to filter noise outside the range of the signals transmitted, a shifting mechanism configured to shift the wavelength of the signals transmitted, and a second mechanism configured to filter the transmitted signals that have undergone wavelength shifting.

12. The device according to claim 11, further including a second wavelength shifting mechanism configured to return the signals that have undergone filtration at said second mechanism to their initial wavelength.

13. The device according to claim 11, wherein the wavelength shifting mechanism include a widening means configured to widen the spectrum of the signals.

14. The device according to claim 11, wherein the wavelength shifting mechanism includes an optical phase conjugation mechanism.

15. The device according to claim 11, wherein the first or second filtration mechanism includes a Bragg filter.

* * * * *